May 19, 1942.   C. W. BROWN   2,283,845
METHOD OF MAKING VARIEGATED BALLS
Filed Jan. 29, 1940     2 Sheets-Sheet 1

Clarence W Brown.
INVENTOR

May 19, 1942.   C. W. BROWN   2,283,845
METHOD OF MAKING VARIEGATED BALLS
Filed Jan. 29, 1940   2 Sheets-Sheet 2

Clarence W. Brown,
INVENTOR
BY Victor J. Evans & Co.
ATTORNEYS

WITNESS

Patented May 19, 1942

2,283,845

UNITED STATES PATENT OFFICE 2,283,845

METHOD OF MAKING VARIEGATED BALLS

Clarence W. Brown, Chicago, Ill.

Application January 29, 1940, Serial No. 316,254

5 Claims. (Cl. 18—55)

My invention relates to the art of manufacturing sponge rubber balls, and has among its objects and advantages the provision of an improved method of designing the ball in various color patterns.

In the past many attempts have been made to devise a color pattern for sponge rubber balls which would withstand the wear incident to usage. The color patterns have been created by applying a coat of enamel to the surface of the ball. After a short period of use, the enamel cracks or wears off, thereby impairing the artistic appearance of the design.

According to my method, the color pattern is incorporated in the material of the ball, whereby wear does not impair the artistic pattern.

Figure 5:
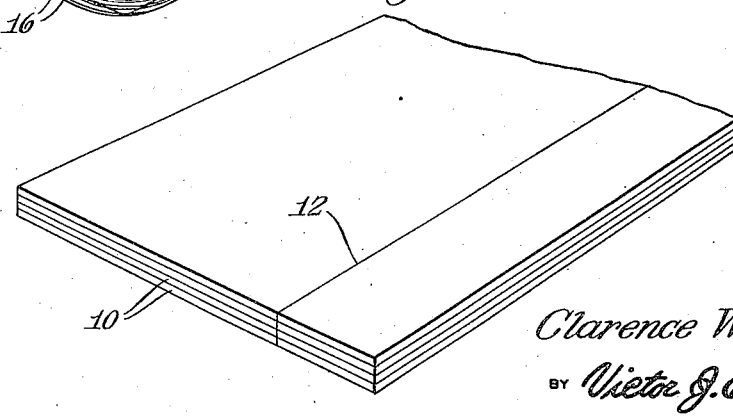
Fig. 5 is a perspective view illustrating another step.

In constructing the ball, I make use of sponge rubber sheets made up in different colors. In Fig. 5, I illustrate a plurality of sheets 10 as being arranged in stacked relation. These sheets come from the warm-up mill in thicknesses varying between three eights and one half of an inch. The number of differently colored sheets in the stack determines the nature of the color pattern in the finished ball. When the sheets are removed from the warm-up mill, the material is somewhat tacky and the sheets will adhere one to the other. After the requisite number of sheets have been stacked according to Fig. 5, the composite sheet or mass is severed longitudinally along lines 12 to provide strips for delivery to a tubing machine.

Figures 3, 4:
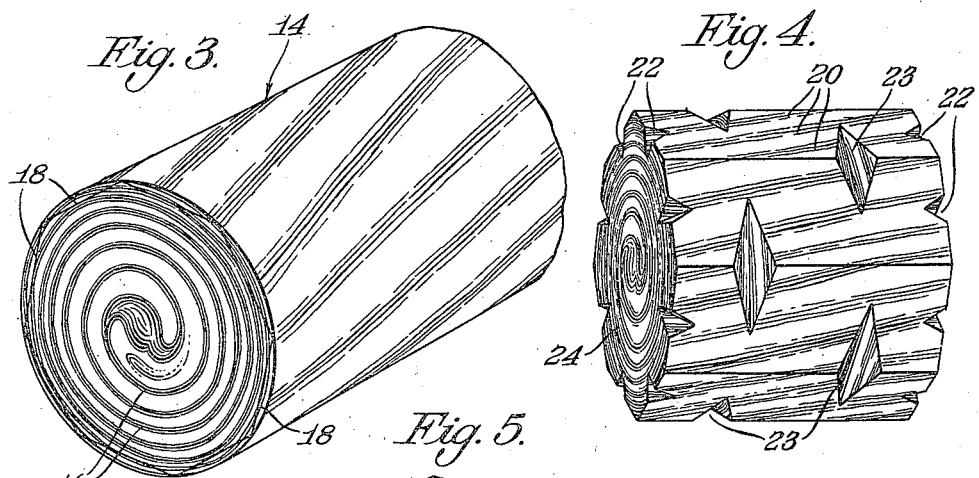
Fig. 3 is a perspective view illustrating one step in the method of preparing the material of the ball.
Fig. 4 is a perspective view illustrating another step in the preparation of the material.
Figure 6:
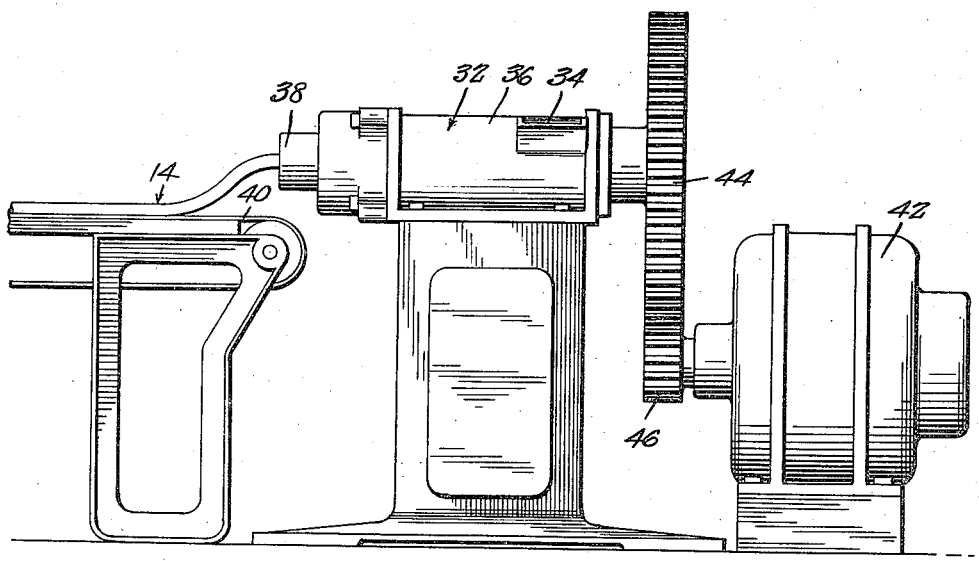
Fig. 6 is a diagrammatic elevational view of a tubing machine.

The strips are extruded from a tubing machine 32 to fashion a cord such as is indicated at 14 in Figs. 3 and 6. The strips are fed into the tubing machine 32 through the opening 34 and forced through the cylinder 36 of the machine by the usual screw or auger for extruding the cord 14 through the die 38. The cord 14 may be extruded onto a conveyor 40, and the machine is driven through the medium of a motor 42 through the medium of gears 44 and 46. After extrusion, the material of the differently colored sheets take the form of spirals 16 when the cord is viewed in cross section. However, the cord is extruded as a unit mass.

After the cord is extruded from the machine, the exposed spiral or spirals 16 extend a considerable distance longitudinally of the cord which gives the cord the appearance of a more or less uniform color. To increase the visibility of the number of differently colored areas, the cord is slabbed longitudinally along lines 18. In slabbing the cord, I expose a plurality of the spiral 16 in each of the flat faces 19, as indicated at 20 in Fig. 4. I prefer to cut the cord 14 into thirty six inch lengths before slabbing. After slabbing, the cord is cut into lengths or units of predetermined mass, each length representing the material of a ball. After severing the cord to provide units representing the material of the individual balls, as illustrated in Fig. 4, the ends and sides of each unit is notched at 22 and 23 respectively.

Figure 1:
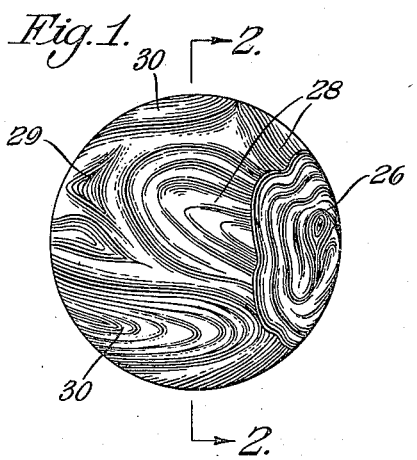
Fig. 1 is a view illustrating a ball constructed according to my method.
Figure 2:
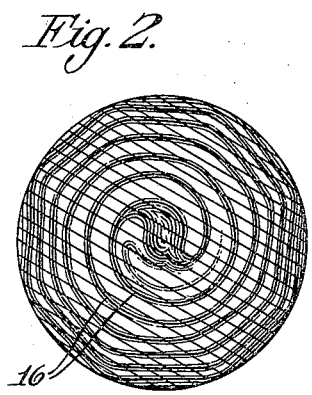
Fig. 2 is a sectional view along the line 2—2 of Fig 1.

The units illustrated in Fig. 4 are shaped to take the spherical form of Fig. 1 by placing the mass in a suitable mold. Such molds are well known in the art. The mold is placed in a hot press and heated for about fifteen minutes. The method of converting the mass of Fig. 4 to the spherical form of Fig. 1 may conform to conventional methods of shaping sponge rubber balls.

Sponge rubber includes soda and stearic acid which cause expansion of the rubber when heated. As the unit of Fig. 4 is expanded within the spherical mold, a beautiful color pattern is attained. The end 24 of the unit of Fig. 4 appears in the form of a color pattern 26 in Fig. 1. The spirals 16 exposed by the notches 22 and 23 appear in the form of patterns 28 and 29 respectively, while the spirals exposed at 20 appear at 30. Various color patterns as a whole may be attained by varying the nature of the slabbing and the number and size of the notches 22 and 23.

My invention embodies a color pattern incorporated in the material of the ball in such a manner that no amount of wear will impair the pattern. Patterns of various color combinations may be attained through the selection of the sheets 10. The method of forming the pattern eliminates the necessity of applying enamel to the ball after shaping the mass.

Having thus described certain embodiments of my invention in detail, it is, of course, understood that I do not desire to limit the scope thereof to the exact details set forth except in- sofar as those details may be defined in the appended claims.

I claim:

1. The method of manufacturing a variegated ball which consists in uniting differently colored sheets of sponge rubber, passing the united sheets in strip form through an extruding machine to form a cord, severing the cord in predetermined lengths, and expanding the severed portions of the cord in a mold to shape the mass into spherical configuration.

2. The method of manufacturing variegated balls which consists in passing strips of differently colored sponge rubber through an extruding machine to form a cord, slabbing the cord extruded from the extruding machine, cutting the extruded cord into predetermined lengths, and expanding the lengths in a mold to shape the finished ball.

3. The method of manufacturing variegated balls which consists in passing differently colored sponge rubber through an extruding machine to form a cord, slabbing the cord formed by the extruding machine, cutting the cord into predetermined lengths, notching the lengths, and expanding the same in a mold to shape the length into spherical configuration.

4. The method of manufacturing variegated balls which consists of grouping sponge rubber sheets of different colors, shaping the sheets into the form of a cord in which the differently colored sheets appear in the form of spirals when the cord is viewed in cross section, slabbing the cord and cutting the same into predetermined lengths, and shaping the lengths into spherical form.

5. The method of manufacturing variegated balls which consists of grouping sponge rubber sheets of different colors, shaping the sheets into the form of a cord in which the differently colored sheets appear in the form of spirals when the cord is viewed in cross section, slabbing the cord and cutting the same into predetermined lengths, cutting notches in the lengths, and shaping the lengths into spherical form.

CLARENCE W. BROWN.